(12) United States Patent  
Ehrmann et al.

(10) Patent No.: US 8,357,875 B2
(45) Date of Patent: Jan. 22, 2013

(54) LASER SEALING OF PACKAGES

(75) Inventors: Elmar Ehrmann, Bad Groenenbach (DE); Tieme Jan Slomp, Bad Groenenbach (DE); Robert Maier, Babenhauser (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 252 days.

(21) Appl. No.: 12/855,953

(22) Filed: Aug. 13, 2010

(65) Prior Publication Data
US 2011/0036817 A1 Feb. 17, 2011

(30) Foreign Application Priority Data

Aug. 13, 2009 (DE) .................... 10 2009 037 404

(51) Int. Cl.
*B23K 26/00* (2006.01)

(52) U.S. Cl. ......... 219/121.63; 219/121.64; 219/121.82; 219/121.84; 219/121.86

(58) Field of Classification Search ............ 219/121.63, 219/121.64, 121.82, 121.84, 121.86
See application file for complete search history.

(56) References Cited

U.S. PATENT DOCUMENTS

| 4,847,462 | A |   | 7/1989 | Soodak et al. |            |
|-----------|---|---|--------|---------------|------------|
| 5,049,720 | A |   | 9/1991 | Fang et al.   |            |
| 5,500,503 | A | * | 3/1996 | Pernicka et al. | 219/121.64 |
| 5,502,292 | A | * | 3/1996 | Pernicka et al. | 219/121.64 |
| 5,893,959 | A |   | 4/1999 | Muellich      |            |
| 6,207,925 | B1|   | 3/2001 | Kendall       |            |
| 6,966,968 | B2|   | 11/2005| Chen et al.   |            |
| 2008/0104930 | A1 | | 5/2008 | Sparakowski et al. |     |

FOREIGN PATENT DOCUMENTS

| DE | 39 10 790 A1 | 10/1990 |
| DE | 195 10 493 A1 | 10/1995 |
| DE | 195 16 726 A1 | 11/1996 |
| DE | 197 82 074 T1 | 9/1999 |
| DE | 198 15 439 A1 | 10/1999 |
| DE | 20 2006 014 872 U1 | 11/2006 |
| EP | 0 483 569 A1 | 5/1992 |
| EP | 1 366 890 A1 | 12/2003 |
| EP | 1 908 689 A2 | 4/2008 |
| WO | 00/50305 A1 | 8/2000 |
| WO | 2010/024189 A1 | 3/2010 |

OTHER PUBLICATIONS

German Office Action Dated Jun. 11, 2010, Applicant Multivac Sepp Haggenmueller GmbH & Co. KG, Application No. 10 2009 037 404.3-27, 5 Pages.
German Abstract No. DE 197 82 074 (T0), Applicant Brian Kendall.
European Search Report Dated Nov. 25, 2010, Applicant Multivac Sepp Haggenmueller GmbH & Co., KG, Application No. 10006881.6-2308, 3 Pages.

\* cited by examiner

*Primary Examiner* — Minh-Loan T Tran
(74) *Attorney, Agent, or Firm* — Husch Blackwell LLP

(57) ABSTRACT

A device for welding a plurality of foils to one another by means of a laser, for use in a packaging machine, comprises a clamping unit configured for applying pressure to a plurality of foils in a predetermined area as well as for conducting the laser radiation used for the purpose of welding to this area. A method for welding a plurality of foils to one another by means of a laser in a sealing station comprises welding the foils to one another along a sealing seam by means of the radiation of the laser while pressing them together in the area of the sealing seam.

23 Claims, 6 Drawing Sheets

LASER SEALING OF PACKAGES

CROSS-REFERENCE TO RELATED APPLICATIONS

This application claims foreign priority benefits under 35 U.S.C. §119(a)-(d) to German patent application number 10 2009 037 404.3, filed Aug. 13, 2009, which is incorporated by reference in its entirety.

TECHNICAL FIELD

The present invention relates to a device and method for welding a plurality of foils to one another.

BACKGROUND

From DE 19782074 it is known that plastic films or foils can be fused to one another by means of a laser for the purpose of producing packages or bags. In so doing, a light absorbing foil itself can be heated for such fusion, or a component can be heated, which is in mechanical contact with at least one of the foils.

For packing fresh food such that the longest possible shelf life is accomplished, it will often not suffice to only close the package in an air-tight manner. The demands that have to be met by the atmosphere in the closed package are here much higher. In order to achieve very low residual oxygen values in the package, it is necessary to generate a vacuum of e.g. less than 10 mbar or to evacuate the package and/or flush it with gas, preferably with nitrogen and/or a gas mixture containing carbon dioxide, before the package is closed.

DE 19782074 does not provide any information how packages with a modified atmosphere could be produced and sealed, respectively, by means of a laser.

Normally, packages with a modified atmosphere are, e.g. on deep-drawing packaging machines, evacuated and/or flushed with gas through a closed chamber in the sealing station and the foils are pressed together and fused to one another by means of a permanently heated sealing plate so as to form a sealing seam that is closed all around. A high expenditure of energy is here necessary for permanently maintaining the sealing plate in a heated condition at the temperature required, and, for changeover operations, a cooling time required for cooling down has to be observed.

SUMMARY

It is now an object of the present disclosure to develop a device for a packaging machine that is able to produce packages under a modified atmosphere with higher energy efficiency, thus satisfying the high demands that have to be met in the food industry and thus also being able to cope with the high demands on the performance of a packaging machine in highly automated environments.

This object is achieved by the teaching of claim 1 or 15, in which the function of fusing the foils in surroundings with a modified atmosphere is taken over by a laser, instead of a heated sealing plate. According to at least one embodiment of the disclosure, a clamping unit for the foils has a double function: it serves not only for clamping the foils but also for conducting the laser radiation to the sealing seam.

In order to be able to produce packages with a modified atmosphere, it is necessary to circumferentially close the package in a sealing station, preferably by means of a die top and a die bottom, by clamping together a cover foil and a lower foil or a tray, whereby a hermetically sealed chamber is formed. Provided that a sealed chamber exists, the atmosphere in packages can be adapted systematically by changing the atmosphere in the chamber. When the desired atmosphere has been accomplished, the clamping plate clamps the cover foil and the lower foil or tray in position on the die bottom, in particular in the area of a sealing seam to be produced, so that a reliable contact is established between the cover foil and the lower foil or tray during the heating step and so that a desired fusion of the foils with one another can be achieved by a high contact pressure even if the temperatures to which the foils are heated are not so high, and so that the foils will also be reliably held until the sealing seam has cooled down and the package will be closed safely before the chamber is opened. This sealing must be executed circumferentially and continuously close to the edge of a package so as to be able to produce a hermetically sealed package with an evacuated and/or modified atmosphere. For allowing the use of a laser for heating the foils, two prerequisites must be established. On the one hand, the material of the clamping plate should absorb little, or preferably not at all, so as to be able to transmit, as far as possible, the whole energy of the laser radiation to the place of work. This is preferably realized by means of a transparent plastic material or glass. On the other hand, the foils should, at least in the area of the sealing seam, have the property of being heatable directly or indirectly through laser beams; they should e.g. have an absorbing effect. This can be realized by dark colouring or by particles which are applied to, or which are already present in the cover foil and/or the lower foil or tray and which have absorbing characteristics for the laser radiation in question.

When the laser radiation is absorbed by the foils, said foils will warm up. In this respect, it is of decisive importance which kind of laser (solid state laser, gas laser, semiconductor laser and other kinds of laser) and which laser type (e.g. Nd:YAG laser, $CO_2$ laser) are used and which beam intensity and/or beam shape is/are adjusted. Also the absorption characteristics of the foil or of the particles in the foils or of coatings which are capable of causing such absorption characteristics are of decisive importance.

A laser source is preferably located outside the sealing station and the laser radiation is transmitted through a non-absorbing area of the sealing die top into the interior of the chamber and, consequently, also through the clamping plate to the foils. This embodiment solves the problem of transmitting the laser radiation through a closed chamber to the fusion site and of simultaneously maintaining the foils in a compressed condition so as to achieve high process reliability and thus a reproducible quality of the sealing seam.

The foils are fixed by the sealing die top and the sealing die bottom at the outermost possible location, so as to allow the cover foil to be lifted upwards in the interior of the chamber, e.g. due to pressure differences above and below the cover foil, or mechanically by means of gassing nozzles provided in the die bottom. This results in a fast and effective exchange of atmosphere in this area, preferably by evacuating and reflushing with a gas mixture of nitrogen and carbon dioxide. It is thus possible to achieve with a very low residual oxygen content in the package a particularly long shelf life especially in the case of meat and sausages.

The laser radiation follows the contour of the sealing seam to be produced and, in so doing, it fuses the foils to one another. To this end, an optical system, from which the laser radiation exits, is controlled such that the contour acted upon by the laser radiation can be adapted in accordance with the demanded track shape.

The advantage of an x-y positioning unit for the optical system is a very high track accuracy and a constant distance between the location where the beam exits and the foil. Likewise, a maximum flexibility is given, so that it will be possible to realize all the packages that can be produced and all the various forms of packages and, consequently, defined sealing seam contours and cutting edges during cutting by means of a laser.

In cases of use with a small required area for the sealing seams, a scanner used for the purpose of orientation will be the most space-saving and advantageous solution.

Due to the fact that the sealing seam contours to be produced can be chosen freely, it will make sense to store these sealing seam contours in a memory, so that, after the change of a package form, they will then be available for and executable by the laser immediately and without any further changeover operations when the production of a batch is started.

In order to be independent of the absorption characteristics of the foils, the laser may also heat a component which, during the process of melting by means of the clamping plate, is in contact with one side of the foils in the area of the sealing seam or which constitutes a part of the clamping plate itself. This component can be positioned on the side of the foils located opposite the side on which the laser radiation impinges. The laser radiation will then pass through the foils so as to heat the component, e.g. metal.

A suitable laser form is the diode laser, since this kind of laser allows the radiation to be flexibly conducted via optical fibre cables.

The device can be used preferably at the sealing station of deep-drawing packaging machines or of tray sealers.

According to a particularly suitable sequence of method steps for a packaging machine, in the case of which a plurality of foils are to be welded to one another in the area of the sealing seam by means of laser radiation in a sealing station, the foils are fixed all around by the sealing die top and the sealing die bottom in a first operating step. Subsequently, the foils are spaced apart so that, during the subsequent or simultaneous evacuation and/or gas flushing, the atmosphere will be modified rapidly and with process reliability in the predetermined way. When the desired atmosphere has been accomplished, the clamping plate presses the foils in the area of the sealing seam against the sealing die bottom, and the laser radiation welds the foils to one another by heating them in this area.

Alternatively, it is also possible that the sealing die bottom or a component thereof or the clamping plate or a component thereof absorbs the laser radiation in the area of the sealing seam to be produced, and is thus heated by said laser radiation, so that the heat produced will then be transferred to the foils which are in contact with the component in question. In this case, a laser which is energetically pulsed in an advantageous manner can be used, since the heat will be distributed in the component in question.

The laser radiation can be conducted from outside through the sealing die top or the sealing die bottom to the foils by making this area accessible to the laser radiation through non-absorbing materials.

The laser radiation can be transmitted from above and/or from below to the foils or the components to be heated, but it is also imaginable that the unit for varying the position of the laser radiation is already located in the interior of the chamber.

Following the sealing process, the laser, operating with suitably adapted performance and adjustment parameters, can cut through both foils outside the sealing seam produced, so as to obtain individual packages. This necessitates the use of a suitable package transport of the individual packages away from the sealing station, or the individual packages are not cut through completely insofar as a few small connecting bridges remain between the packages and a foil, and the packages are only removed from the (lower) foil in an additional work station located downstream of the sealing station.

In the following, advantageous embodiments of the present disclosure will be explained in more detail with reference to the below drawings.

DETAILED DESCRIPTION

Figure 1:
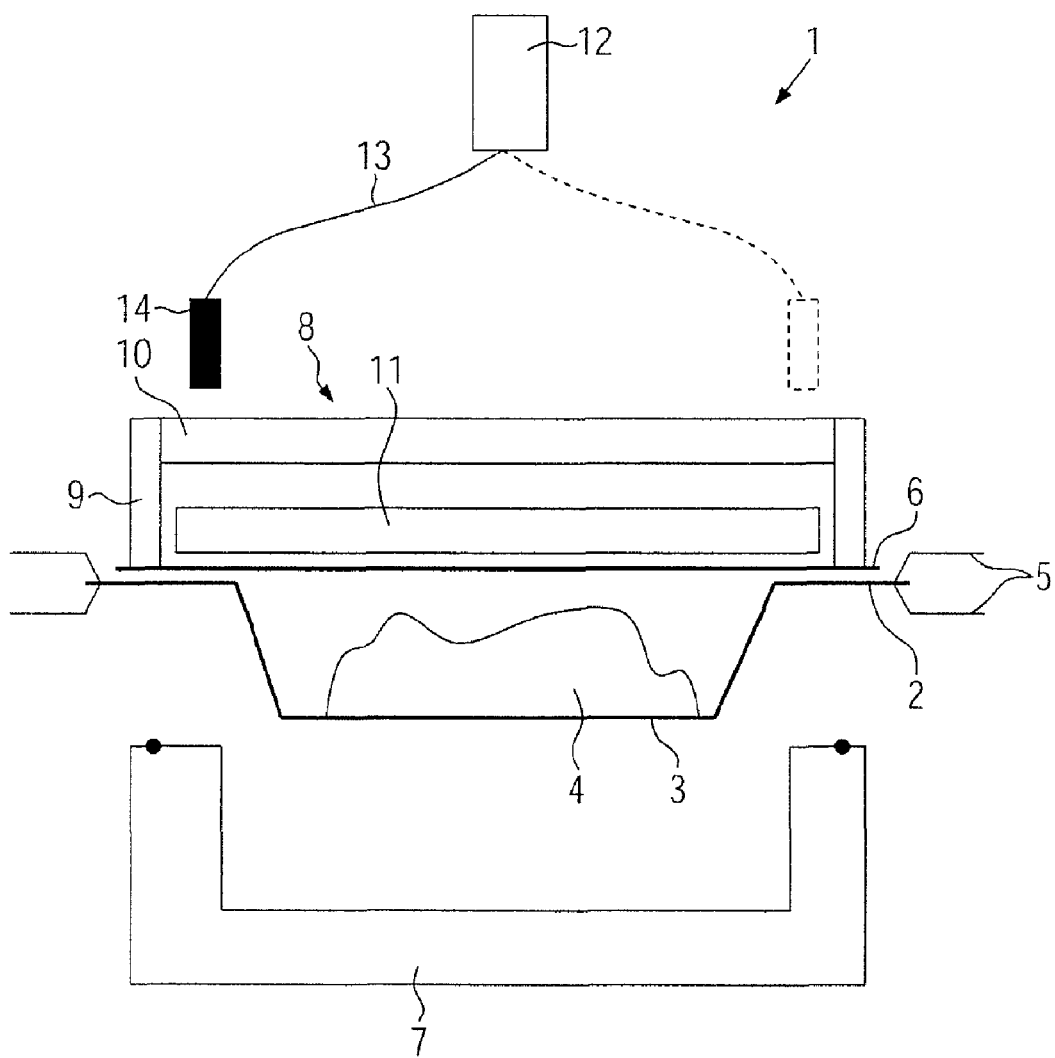
FIG. 1 shows a schematic sectional view of a device according to the present invention in the direction of production in the form of a sealing station.

Identical components are provided with identical reference numerals throughout the figures.

FIG. 1 shows a sealing station 1 of a deep-drawing packaging machine in the direction of production with a lower foil or layer 2 into which a trough 3 was formed in a forming station, which is not shown, and into which a product 4 was subsequently placed. The lower foil 2 is intermittently fed through a clip chain 5 that holds the lower foil 2 on the side.

A cover foil or layer 6 has already been fed to the sealing station 1. The sealing station 1 itself comprises a sealing die bottom 7 that can be moved up and down by a lifting unit, which is not shown. The sealing die top 8 comprises a frame 9 and a non-absorbing window 10. In the interior of the sealing die top 8, a non-absorbing clamping plate 11 is additionally provided. A laser source 12 is provided above the sealing station 1. From this laser source 12, a laser beam can be transmitted through the sealing die top 8 to the foils 2 and 6 by means of an optical fibre cable 13 and an optical system 14. The optical system 14 can be configured for adjusting and orienting the beam shape.

Figure 2:
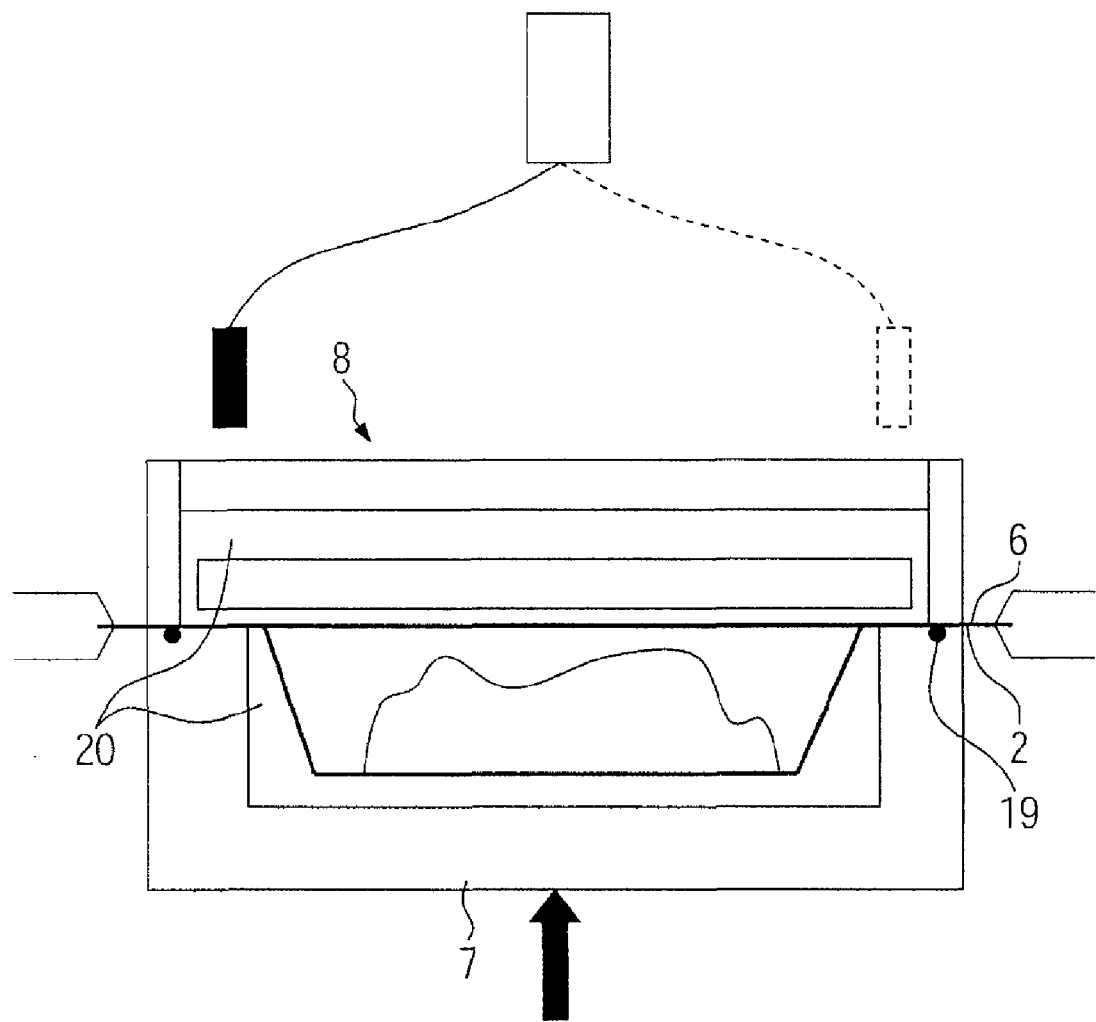
FIG. 2 shows a schematic sectional view according to FIG. 1 with a closed chamber.

In FIG. 2, the sealing die bottom 7 has been moved upwards up to and onto the sealing die top 8, whereby the cover foil 6 and the lower foil 2 have been clamped all around between the sealing die top 8 and the sealing die bottom 7 via the sealing gasket 19 and a hermetically sealed chamber 20 has been formed.

Subsequently, the operation for evacuating the chamber 20 and, consequently, also the interior of the package can be executed. This is realized via the sealing die bottom 7 through holes and air discharge lines, which are not shown. For obtaining a modified atmosphere, a gas or a gas mixture, preferably nitrogen or carbon dioxide, can be supplied simultaneously or subsequently via gas nozzles, which are not shown, so as to achieve the lowest possible residual oxygen content in the interior of the package.

Figure 3:
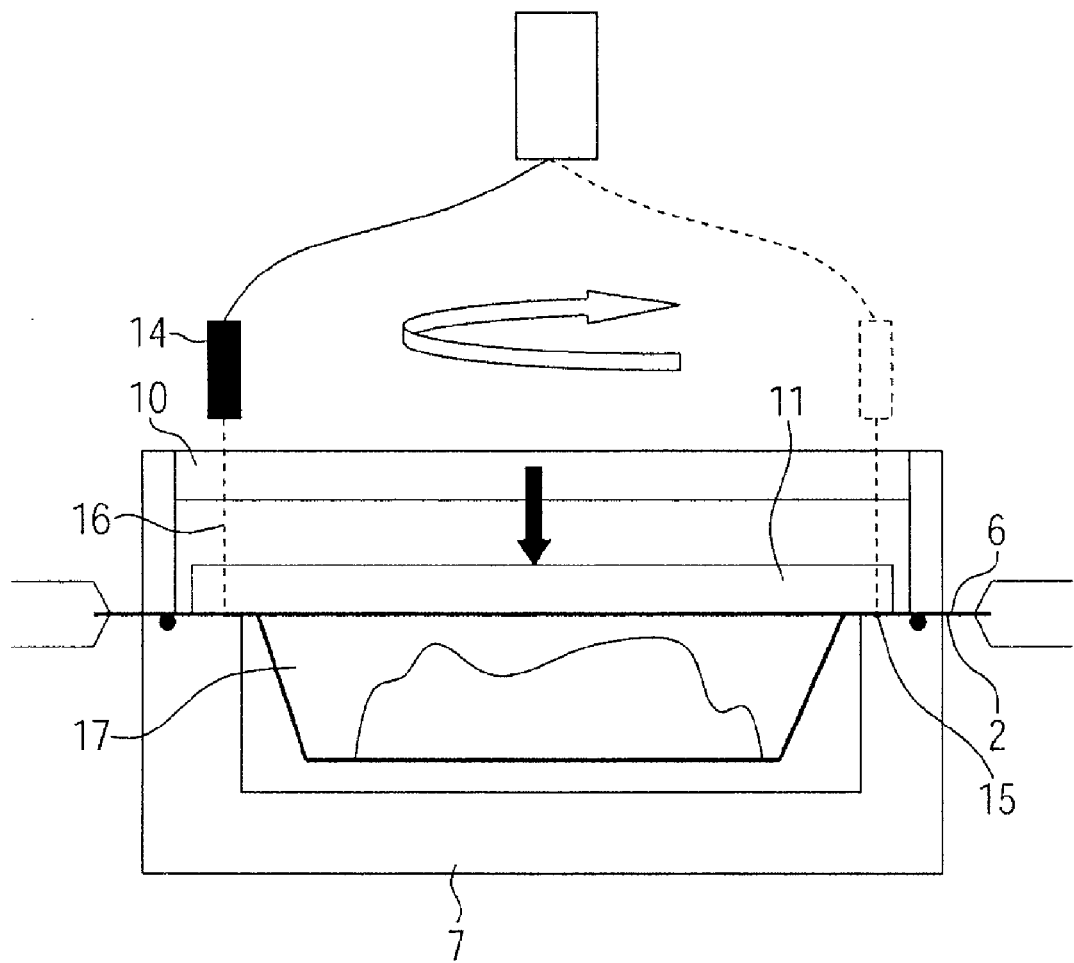
FIG. 3 shows a schematic sectional view according to FIG. 2 with a clamping plate and laser radiation in operation.

When the exchange of atmosphere has been finished, the clamping plate 11 is, as shown in FIG. 3, positioned against the sealing die bottom 7. At this position, it presses the cover foil 6 and the lower foil 2 against the sealing die bottom 7 at least in the area of the sealing seam 15 which still is to be produced.

For executing the welding process, the laser beam 16 now penetrates from outside through the window 10 in the sealing die top 8 and through the clamping plate 11 to the foils 2 and 6 so as to heat said foils in the compressed state in the area of the sealing seam 15. This has the effect that the absorbing components contained in the foil in at least this area will be heated by the laser beam 16 such that the two foils 2 and 6 will be fused to one another. Subsequently, the sealing seam 15 will have the property of hermetically sealing the package 17 as well as the property of being separable such that the cover foil 6 can be removed from the lower foil 2 by drawing, so that the product 4 can be removed from the package 17.

In the course of this process, the optical system 14 is displaced above the sealing station 1 in accordance with the sealing seam 15 to be produced, so that a sealing seam 15 which is closed in itself can be formed for each package.

Figure 4:
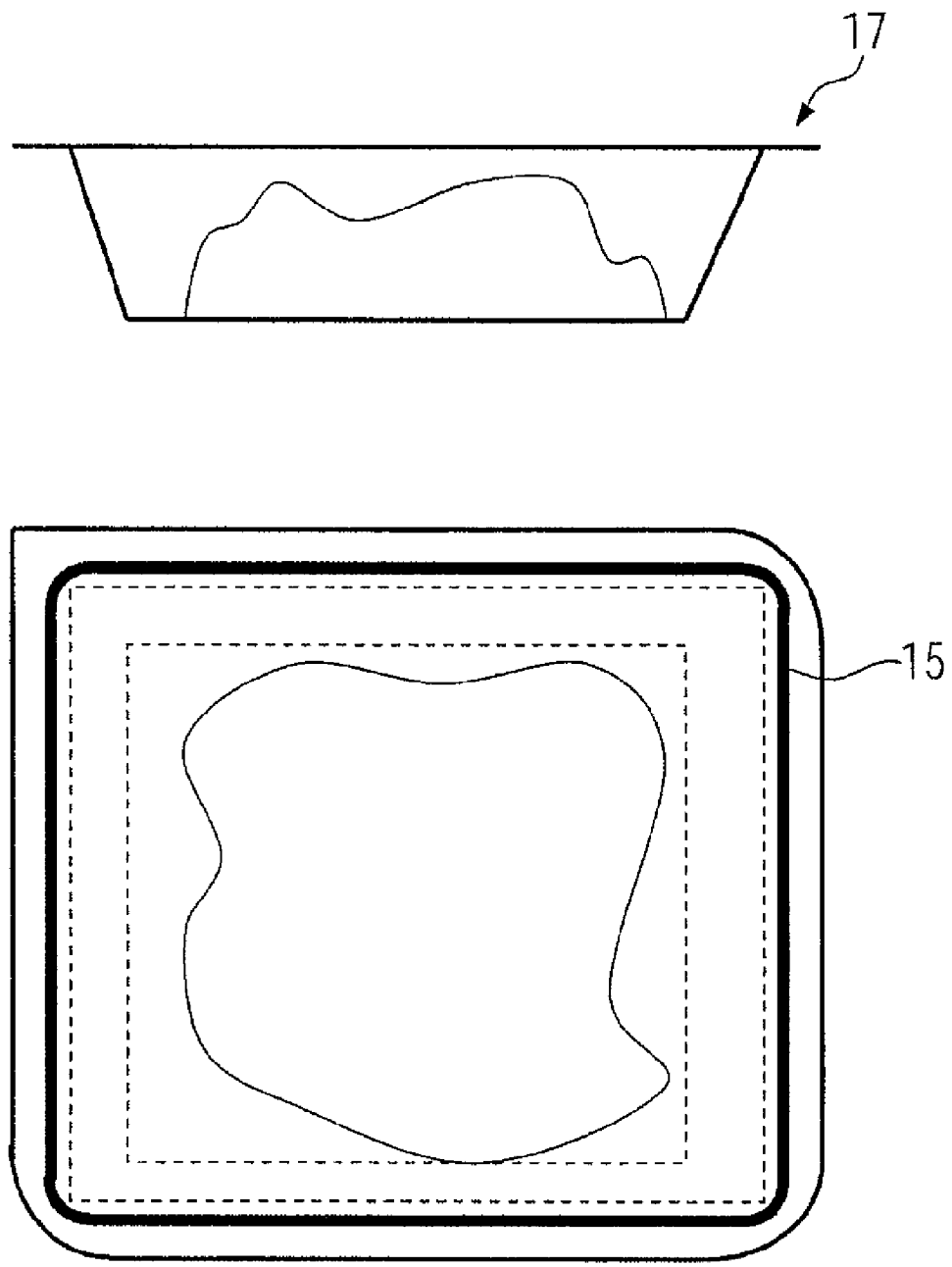
FIG. 4 shows a top view of a package with a sealing seam.

FIG. 4 shows, as a result, a top view of a finished package 17 with a closed sealing seam 15, which package 17 was singulated from the foil web in a cutting station following in the direction of production, said cutting station being, however, not shown.

Figure 5:
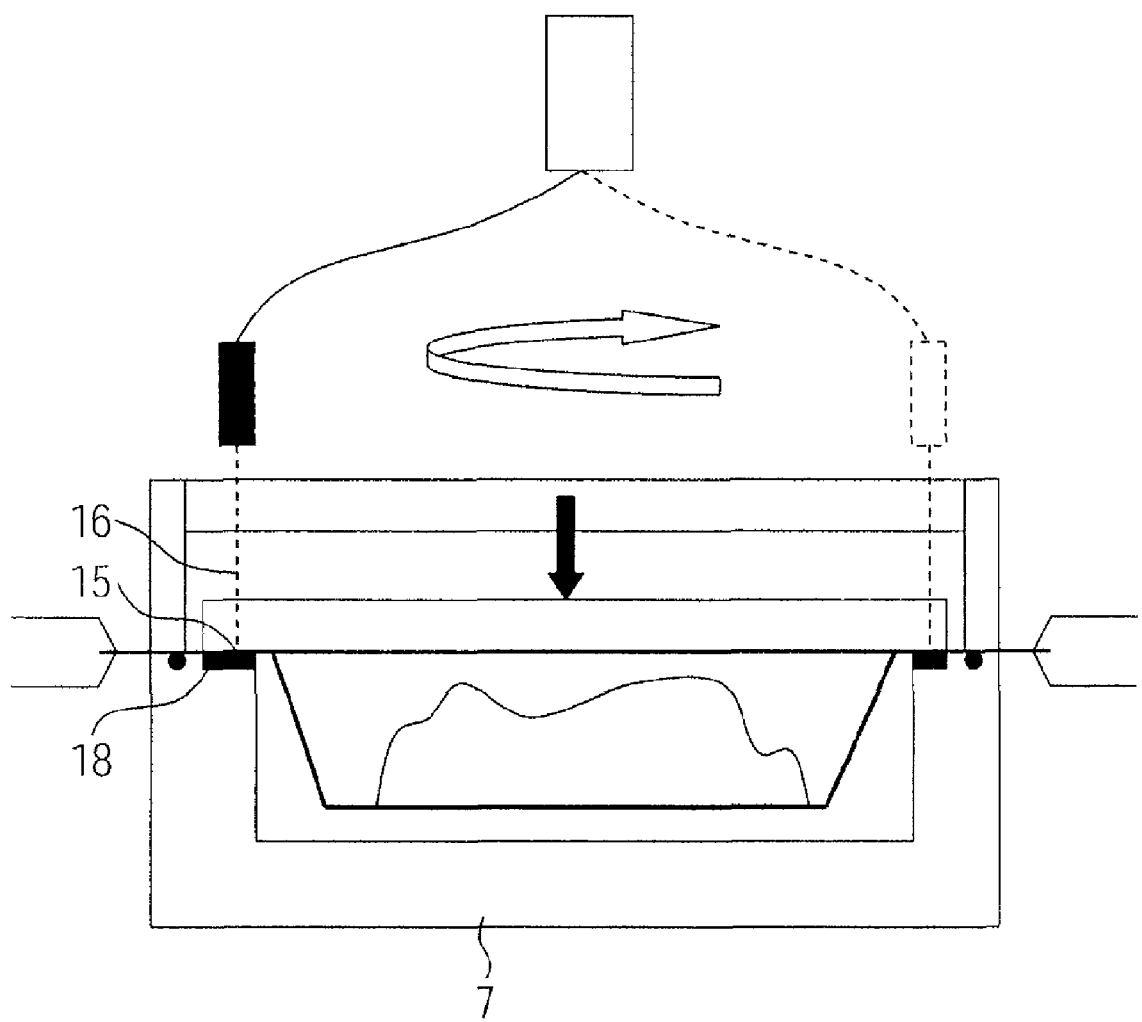
FIG. 5 shows a schematic sectional view according to FIG. 3 in a variant.

An alternative embodiment of the device according to the present invention is shown in FIG. 5. In the case of this embodiment, the laser beam 16 does not heat the foils themselves, but it heats a suitable absorbing section or insert 18 in the sealing die bottom 7, so as to generate the necessary heat for the fusion process in the area of the sealing seam 15.

Figure 6:
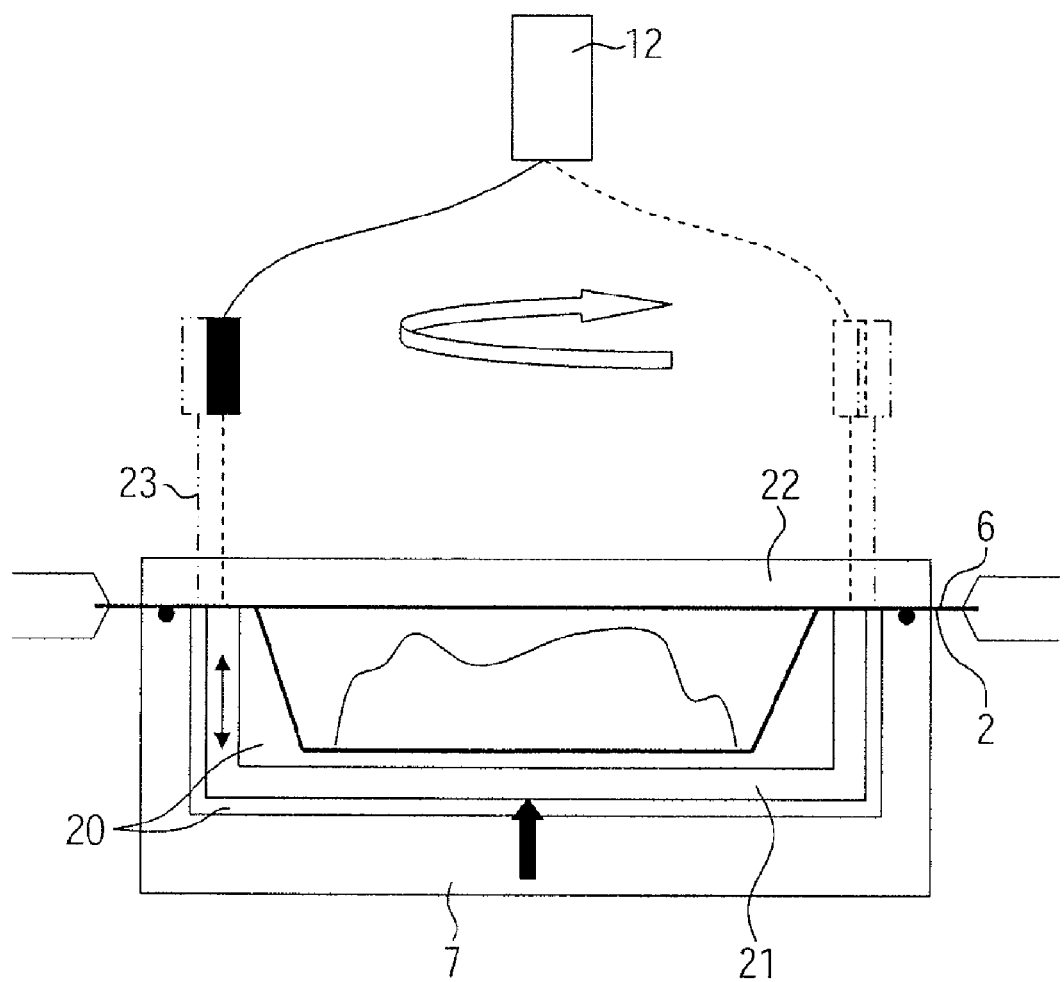
FIG. 6 shows a schematic sectional view according to FIG. 3 in a variant making use of a clamping frame.

FIG. 6 shows a variant in the case of which the sealing die top is configured as a glass cover 22 that is transparent to the laser radiation, and in the case of which this glass cover 22 and the sealing die bottom 7 define a chamber 20. For producing the sealing seam, a clamping frame 21 is moved within the sealing die bottom 7 onto the glass cover 22, whereby the two foils 2, 6 are pressed together. The clamping frame 21, or only the part of the clamping frame contacting the foil 2, can be absorbing, in case the absorbing effect produced by the foils 2, 6 should not suffice. The double arrow in FIG. 6 indicates that the clamping frame 21 can be moved up and down within the sealing die bottom 7, so as to clamp and release, respectively, the foils 2, 6. The thicker arrow indicates that an upwardly directed pressure can additionally be applied to the clamping frame 21, said pressure being advanced to the foils 2, 6 so that the foils 2, 6 will be in close contact with one another.

As additional not shown embodiments it would also be imaginable to implement the insert 18 as a part of the clamping plate 11 or to configure the insert 18 as well as the foils 2 and 6 such that they can be heated by the laser beam 16.

Likewise, the variant comprising the laser source 12, the optical fibre cable 13 and the optical system 14 can be replaced e.g. by a ($CO_2$) laser whose beam is moved by an x-y positioning unit above the sealing die top along a path for producing a closed sealing seam.

Instead of providing a transparent window 10 in the sealing die top 8, also the whole sealing die top 8 may be transparent.

In the embodiment according to FIG. 6, a first laser beam is used for sealing the foils 2, 6, whereas a second laser beam 23 is used for cutting through the foils 2, 6, at least in certain sections thereof, outside the sealing seam 15, or, if desired, to fully cut the package out of the residual foils 2, 6. The laser beam 23 used for the purpose of cutting may be the beam of a different laser, or it may be the beam of the same laser 12 which is also used for the purpose of sealing. FIG. 6 shows that the laser beam 23 hits the foils 2, 6 at a location outside the sealing seam. In particular, it hits the foils 2, 6 at a location at which the lower surface of the foils no longer rests on the clamping frame 21, but extends freely towards the chamber 20. It is thus possible to take up in said chamber 20 the foil material that has been evaporated by laser cutting.

When the respective laser beams hit the foils 2, 6, the intensity of the laser beam 23 used for cutting is much higher than the intensity of the laser beam 16 used for sealing. When the same laser 12 is used, this can be accomplished either by increasing the laser power or, preferably, by focussing the laser radiation 23 more strongly in comparison with the laser radiation 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for welding multiple foils to one another for use in a packaging machine, the device comprising:
   a laser that provides laser radiation; and
   a clamping unit configured for applying pressure to the foils in a predetermined area as well as for conducting the laser radiation used for the purpose of welding to the predetermined area;
   wherein the clamping unit comprises a sealing die top and a sealing die bottom, the sealing die top and the sealing die bottom being operable to clamp multiple foils, the sealing die top and sealing die bottom defining a sealed chamber when in a closed position, wherein the sealing die top includes a non-absorbing area and wherein the clamping unit further comprises a clamping plate moveable within a portion of the sealed chamber defined by the sealing die top and operable to clamp a cover foil and a lower foil to the sealing die bottom.

2. A device according to claim 1 wherein the clamping plate includes a non-absorbing area, and wherein the laser radiation is provided as a laser beam that is conducted through the non-absorbing area of the sealing die top and the non-absorbing area of the clamping plate to the foils.

3. A device according to claim 2 wherein the non-absorbing areas of the sealing die top and the clamping plate are transparent.

4. A device according to claim 1 wherein the device fixes the foils in position all around when sealing die top and sealing die bottom are in a closed position, and spaces the foils apart within the sealed chamber while a vacuum and/or a modified atmosphere is being generated.

5. A device according to claim 1 further comprising an optical system for accurately changing the orientation of the laser radiation.

6. A device according to claim 5 wherein the optical system comprises a power-operated, x-y positioning unit.

7. A device according to claim 6 wherein the optical system changes the orientation of the laser radiation to weld the foils together along a sealing seam having a contour.

8. A device according to claim 1 wherein the device is configured for heating a sealing profile for welding the foils by means of the laser.

9. A device according to claim 1 wherein the laser is a diode laser.

10. A device according to claim 1 wherein the device comprises a sealing station.

11. A device according to claim 1 wherein the device is configured to weld a cover foil and a lower foil together at a sealing seam, and wherein the device comprises a laser for cutting through at least the cover foil outside the sealing seam.

12. A device according to claim 11 wherein the laser used for welding and the laser used for cutting are the same.

13. A device according to claim 1 wherein the device is part of a deep-drawing packaging machine or of a tray sealer.

14. The device according to claim 1 wherein at least one of the sealing die bottom and the clamping plate includes a laser absorbing section or insert.

15. A method for use in a packaging machine for welding multiple foils to one another by means of a laser in a sealing station, the method comprising:
   clamping a cover foil and a lower foil between a sealing die top and a sealing die bottom, the sealing die top and sealing die bottom defining a sealed chamber;
   spacing the cover foil and the lower foil apart;
   evacuating and/or gas flushing the sealed chamber;
   pressing the foils together between the sealing die bottom and a clamping plate disposed within a portion of the sealed chamber defined by the sealing die top, the clamping plate moveable within the sealed chamber and having an area larger than the area of a sealing seam, and
   welding the foils to one another along the sealing seam by means of radiation of the laser.

16. A method according to claim 15 further comprising heating at least one of the sealing die bottom or the clamping plate by the laser radiation.

17. A method according to claim 16 wherein, during the welding operation, the laser radiation is conducted from outside of the sealed chamber through a non-absorbing area of the sealing die top to the foils or to at least one of the sealing die bottom and the clamping plate.

18. A method according to claim 15 wherein, prior to opening the sealed chamber, the cover foil and/or the lower foil is/are cut through at least partially by means of a laser.

19. A method according to claim 18 wherein the laser used for welding and the laser used to cut are the same.

20. A method according to claim 15 wherein, during the welding operation, the laser radiation is conducted through a non-absorbing area of the sealing station to the foils or the unit.

21. The method according to claim 15 wherein said welding step comprises heating a laser absorbing section or insert of at least one of the sealing die bottom or the clamping plate with the laser.

22. A device for welding multiple foils to one another for use in a packaging machine, the device comprising:
   a laser that provides laser radiation; and
   a clamping unit configured for applying pressure to the foils in a predetermined area as well as for conducting the laser radiation used for the purpose of welding to the predetermined area;
   wherein the clamping unit comprises a non-absorbing cover plate and a sealing die bottom, the non-absorbing cover plate and the sealing die bottom being operable to clamp multiple foils, the non-absorbing cover plate and sealing die bottom defining a sealed chamber when in a closed position, wherein the clamping unit further comprises a clamping frame moveable within a portion of the sealed chamber defined by the sealing die bottom and operable to clamp a cover foil and a lower foil to the non-absorbing cover plate; and
   wherein the laser is operable to weld the foils together along a continuous sealing seam.

23. The device according to claim 22 wherein the clamping frame includes a laser absorbing section or insert.

\* \* \* \* \*